2,956,968

MODIFIED POLYAMIDE RESINS

Geoffrey Swann, Woolton, and Peter Gilbert Evans, Liverpool, England, assignors to Beck, Koller & Company (England) Limited, Liverpool, England, a British company No Drawing. Filed Feb. 2, 1956, Ser. No. 562,956

Claims priority, application Great Britain Feb. 7, 1955

12 Claims. (Cl. 260—21)

This invention relates to new modified polyamide resins and synthetic resin compositions containing the same and to the process of making the resin and resin compositions.

The modified polyamide resins of the invention are the reaction products of formaldehyde, a dimeric fatty acid containing two carboxyl groups in the molecule, and an organic triamine, preferably an aliphatic triamine. The dimeric fatty acid component may contain one or more other carboxylic acids and the organic triamine may contain a minor proportion of one or more other organic polyamines.

A suitable acid component is a so-called dimer fatty acid, i.e. a polymerized fatty acid such as polymerized linoleic acid containing a major proportion of dimer (dibasic acid). Such polymerized fatty acids are well known in the art and are products of Emery Industries, Inc., Cincinnati 2, Ohio, sold under the trade name "Empol," and may be made of any of the processes set forth in the following patents owned by such company:

2,482,761, Goebel, September 27, 1949
2,793,219, Barrett et al., May 21, 1957
2,793,220, Barrett et al., May 21, 1957

Patent No. 2,482,761 discloses the use of soy bean fatty acids, linseed oil fatty acids, cotton seed oil fatty acids, and the like as raw materials for the production of the dimeric acids referred to herein, those derived from linoleic acid having been found particularly suitable for the purposes of the present invention.

Patent No. 2,793,219 discloses the production of dimeric acid, for example a 36 carbon dicarboxylic dimerized acid from mono-unsaturated fatty acids such as oleic acid and its isomers, eruic acid and its isomers, undecylenic acid and other mono-unsaturated fatty acids having a chain length of 11 to 22 carbon atoms, whether of animal, vegetable, marine or synthetic origin. Oleic acid is said to be particularly suitable as a raw material for such dimeric acids.

Patent No. 2,793,220 discloses the use of linseed oil, safflower oil, tall oil, cotton seed oil, corn oil and the like as raw materials for use in the manufacture of suitable polymerized fatty acids.

Carboxylic acids which may be present in minor proportions in the acid component include adipic acid and sebacic acid, iso- and terephthalic acids and mixtures of the same and the dibasic acid arising from the dimerization of rosin (rosin dimer).

A suitable organic triamine is diethylene triamine. Organic polyamines which may be present in minor proportions in the amine component include ethylene diamine, propylene diamine, hexamethylene diamine, paraphenylene diamine and para,para'-diaminodiphenyl methane and triethylene tetramine.

The modified polyamide resins can be produced by reacting formaldehyde, or a substance capable of yielding formaldehyde under the conditions of the reaction, with a pre-formed branched chain polyamide derived from a dimeric fatty acid containing two carboxyl groups in the molecule, with or without a minor proportion of one or more other carboxylic acids, and an organic triamine, with or without a minor proportion of one or more other organic polyamines. The reaction can be carried out in the absence of an organic solvent or in the presence of a mutual solvent for the reactants.

The preferred range of the proportions of the reactants is 0.1–5.0 moles of formaldehyde per gram equivalent of unreacted free primary and secondary amino groups in the polyamide, i.e. the amount of formaldehyde to be used is based on the number of unreacted amino groups in the polymer, that is the calculated excess of amino groups, both primary and secondary, over carboxyl groups. For example, in a polymer derived from 1 mole of dimeric fatty acid and 1 mole of diethylene triamine, the calculated quantities of polymer, namely 667 gm., will contain, theoretically, 1 gram equivalent of free primary and secondary amino groups excluding —NH— groups present in the amide groups.

The modified polyamide resins can also be produced by reacting formaldehyde, or a substance capable of yielding formaldehyde, under the conditions of the reaction, with the organic triamine and reacting the product with the dimeric fatty acid containing two carboxyl groups in the molecule. Preferably the molecular proportion in which the formaldehyde and triamine are reacted together is in the range of 0.1 to 5.0.

The modified polyamide resins of the invention have film-forming properties in solution in volatile solvents. They may with advantage be blended with phenol-formaldehyde resins, and a further feature of the invention resides in the provision of a synthetic resin composition comprising a modified polyamide resin as defined above and an incompletely condensed phenol-formaldehyde condensation product as hereinafter defined.

For the purpose of the present specification an incompletely condensed phenol-formaldehyde condensation product is defined as a body derived from ($a$) a total of one molecular proportion of one or more of the following: phenol, alkyl phenols, for example cresol, xylenol and p-tert. butyl phenol and bis-phenols, for example diphenylol propane and ($b$) a total of 0.75–3 molecular proportions of formaldehyde in the case of mono-nuclear phenols and a total of 1.5–6 molecular proportions in the case of di-nuclear phenols or bis-phenols or the equivalent quantity of a substance yielding formaldehyde under the conditions of the reaction.

The above synthetic resin composition is heat-curable and may be used with particular advantage in solution in a solvent as a film former. Preferably the composition is made up by blending a solution of the modified polyamide solution, for example in butanol, iso-butanol, sec-butanol, tert-butanol, propanol or one or more of the isomeric amyl alcohols or any of these in admixture with the aromatic solvents, with the phenol-formaldehyde resin, which itself may be dissolved in a solvent such as water, ethanol, isopropanol or butanol. The blend can be applied and stoved as for a normal stoving finish.

The modified polyamide resins of the invention may also with advantage be blended with epoxy resins containing terminal epoxy groups and a further feature of the invention resides in the provision of a synthetic resin composition comprising a modified polyamide resin as defined above and an epoxy resin containing terminal epoxy groups.

As is known, the above epoxy resins are complex polymeric reaction products of polyhydric phenols with polyfunctional halohydrins, such as epichlorohydrin and glycol dichlorohydrin. The products obtained may contain terminal epoxy groups or terminal epoxy groups and terminal primary hydroxyl groups. Typical polyhydric phenols include resorcinol and various bis-phenols resulting from the condensation of phenol with aldehydes and ketones such as formaldehyde, acetaldehyde, acetone and methyl ethyl ketone.

Synthetic resin compositions comprising the modified polyamide resins and the epoxy resins are heat-curable and may be used with advantage in solution in solvents as film formers. The synthetic resin compositions can with particular advantage be made up by blending the modified polyamide resins with the epoxy resins by heating in the absence of solvents for use in potting, moulding, casting, laminating or impregnating. These heat-blended compositions have the advantage that they remain liquid at the blending temperature for a much longer time than do corresponding compositions containing unmodified polyamide resins.

The following examples further illustrate the invention:

Example 1

800 parts of polyamide based on 3 moles of dimer fatty acid (Empol 1022 ex Emery Industries Inc., believed to be derived mainly from the polymerization of linoleic acid) and 4 moles of diethylene triamine are dissolved in 800 parts of normal butanol with stirring and warming. 282 parts of 36.5% w./w. aqueous formaldehyde are then added with stirring and the mixture is raised to and held at a temperature of 70° C. for 2 hours. The temperature is then raised further and the charge caused to boil, the condensate from the condenser being passed through a decanter system of the Dean and Stark type which continuously separates the lower, water-rich layer and returns the upper, butanol-rich layer to the reaction vessel. When no more water separates the reaction is at an end and the product is adjusted, if necessary, to a 50% non-volatile content by the addition of buantol.

"Empol" is a trademark of Emery Industries Inc., Cincinnati 2, Ohio, covered by Registration No. 593,491, dated August 10, 1954, and claiming use since September 1953 for polymerized fatty acids used in . . . polyamides, polyesters and other chemical intermediates. The product is defined in Reinhold's "The Condensed Chemical Dictionary," Fifth Edition, as follows:

"*Empol*.—Trade-mark for a polymerized fatty acid; a $C_{36}$ dibasic acid made by the dimerization of polyunsaturated fatty acids. Very viscous liquid, acid value 180; saponification value 185; combining weight 305. Used in surface coatings, esters, lubricating greases, corrosion inhibitors, polyamides, polyurethane foams."

This product is commercially available in the United States and Great Britain.

In the above process other solvents or solvent mixtures besides butanol can be employed. These include iso-butanol, sec-butanol and the isomeric amyl alcohols. Propanol, iso-propanol or tertiary-butanol may also be used if a quantity of an aromatic solvent such as toluene is used with them to facilitate separation into two layers in the Dean and Stark trap.

The butanol solution of the modified polyamide produced as described in the above example is blended with a water-soluble type phenolic resin with a P/F ratio of 1:2.16. Blending is effected in the ratio of 2:1 polyamide:phenolic resin (on a non-volatile basis). The resulting clear, amber syrup is then spread as a film on tin-plate and stoved for 30 minutes at 150° C. The stoved film shows excellent gloss, mar-resistance, flexibility and adhesion.

The said modified polyamide in butanol solution has also been found to blend satisfactorily with the following phenol-formaldehyde resins:

(*a*) A water-soluble type phenolic resin with a P/F ratio of 1:1.62, (*b*) A water-soluble type phenolic resin with a P/F ratio of 1:1.48, (*c*) A cresol-type resin with a C/F ratio of 1:1.1035.

The modified polyamide of the foregoing example is made by reacting the polyamide in an equal weight of butanol with formaldehyde in a ratio of 1.5 moles formaldehyde per gram equivalent of unreacted free primary and secondary amino groups in the polyamide.

Example 2

The procedure of Example 1 for the production of the modified polyamide is repeated using a polyamide based on 1 mole of the same dimer acid and 2 moles of diethylene triamine. The quantities by weight employed and the proportion of formaldehyde expressed as moles of formaldehyde per gram equivalent of unreacted free primary and secondary amino groups in the polyamide are as follows:

| Butanol | Polyamide | 36.5% w./w. Formaldehyde | Formaldehyde proportion |
|---|---|---|---|
| 750 | 750 | 353 | 1.1 |
| 250 | 250 | 78 | 0.73 |
| 250 | 250 | 39 | 0.366 |

Example 3

Into a suitable vessel are charged 206 gm. of 36.5% (w./w.) aqueous formaldehyde solution and 103 gm. of commercial grade diethylene triamine. The mixture is agitated and the temperature raised to and held at 90° C. for 30 minutes. 300 gm. of dimer acid (Empol 1022 ex Emery Industries Inc.) are then added and the mixture is raised to a temperature of 100–105° C. and held for 1½ hours. The temperature is then raised slowly to 200° C., the water evolved being allowed to escape through an air-cooled condenser, and held at this temperature until the acid number falls to 5–10. The resin is pressed out. A typical product had the following characteristics:

Viscosity _____ K (60% in butanol/toluene 1:1 by weight).
Acid value _____ 6.7 (base resin).
Amino No. _____ 93.6 (base resin).

whereas a polyamide resin based on 1 mole dimer fatty acid and 2 moles of diethylene triamine when blended with equal quantities of the epoxy resin sold by Shell Chemicals Ltd., under the designation Epikote 828 at 70° C., furnishes a clear melt which gels or sets after 14–16 minutes at this temperature, the modified polyamide resin made as described in the present example requires 65 minutes to set under precisely the same conditions.

"Epikote" is a commercial product of Shell Chemical Company Limited available in Great Britain under this trade name. "Epikote" resins are condensation products of epichlorhydrin and diphenylolpropane, and contain terminal epoxy groups having oxygen linked to adjacent carbon atoms.

In the manufacture of the modified polyamide of this example formaldehyde, diethylene triamine and dimer acid are employed in the molar ratios 2.5:1.0:0.5. The following table compares the gel-times of blends of an epoxy resin with this modified polyamide resin and with modified polyamide resins made by the same procedure but with molar proportions of the three reactants as shown in the table:

| Gel-time — 70° C. 1:1 with Epikote 828, mins. | Moles Formaldehyde | Moles Diethylene triamine | Moles Dimer Acid |
|---|---|---|---|
| 65 | 2.5 | 1.0 | 0.5 |
| 60 | 1.75 | 1.0 | 0.5 |
| 30 | 1.0 | 1.0 | 0.5 |
| 16 | 0.5 | 1.0 | 0.5 |
| 80 | 5.0 | 1.0 | 0.5 |

Example 4

The polyamide resin produced as described in the first part of Example 3 and made up to a 50% solution in 1:1 (v./v.) blend of isopropanol/xylol and a 50% solution of Epikote 1001, 1:1 (v./v.) in methyl isobutyl ketone and xylol were used. These solutions were blended by mixing at room temperature in the ratio of 1:1 and 3:1 (epoxide:polyamide). Both these blends had a pot life at room temperature of 3 days. The blends were reduced to a viscosity of 20 secs. (Ford Cup No. 4) with a diluent consisting of 1:1:1 (v./v./v.) of methyl isobutyl ketone:xylol:cyclohexanol. These thinned solutions were then sprayed on to tin plate and air-dried. Drying times as established on the Beck Koller Drying Recorder were as follows:

|   | Hours |
|---|---|
| 1:1 blend | 0:5¼ |
| 3:1 blend | ½:9¼ |

The air-dried films showed excellent gloss, adhesion, flexibility and hardness and good resistance to water, acids and alkalis.

Example 5

350 gm. of a polyamide resin based on 1 mole dimer fatty acid (Empol 1022 ex Emery Industries Inc.) and 2 moles of diethylene triamine are warmed to 60° C. when 124 gm. of 36.5% (w./w.) aqueous formaldehyde solution are added with stirring and under a suitable condenser. The temperature is then raised to and held at 85° C. for 1½ hours. At this point the condenser is removed and the water vapour allowed to escape freely into the atmosphere. The temperature is then raised slowly to 160° C. and is held there until the resin is clear both hot and cold. A typical product had the following characteristics:

| | |
|---|---|
| Viscosity | T (60% in butanol/toluene 1:1 by weight). |
| Melting point | Very viscous liquid. |
| Amine No | 107. |

In the manufacture of the above product the formaldehyde was employed in a proportion of 0.826 mole per gram equivalent of the free unreacted primary and secondary amino groups in the polyamide.

Example 6

The procedure of Example 5 is repeated using the same polyamide with different quantities of formaldehyde. The quantities by weight employed and the proportion of formaldehyde, expressed in moles per gram equivalent of free amino groups as above, are given below.

| Polyamide | 36.5% w./w. Formaldehyde | Formaldehyde Proportion |
|---|---|---|
| 770 | 410 | 1.25 |
| 350 | 62 | 0.413 |
| 350 | 414 | 2.75 |

Example 7

100 parts of dimer acid (Empol 1022 ex Emery Industries Inc.) and 43.7 parts of 3,3′ diamino-di-propylamine were charged with stirring into a suitable vessel swept out by a stream of nitrogen gas and equipped with a water-cooled condenser. The temperature was raised to 150° C. when a trace of anti-foaming agent was added. After holding for about 90 minutes at 150° C. the water-cooled condenser was replaced by an air-cooled condenser. Water was allowed to escape through the condenser and the reaction temperature was slowly raised to 200° C. The charge was held at 200° C. until the acid value had fallen to below 5. The product was then pressed out. It was a soft, resinous mass and had the following characteristics:

| | |
|---|---|
| Viscosity (Gardner-Holdt scale) | N-00 (60% in 1:1 butanol/toluene). |
| Colour | 10 (60% in 1:1 butanol/toluene). |
| Acid value (base resin) | 4. |

This product was reacted with para-formaldehyde as follows:

Polyamide (50 parts) and N-butanol (50 parts) were charged with stirring into a suitable vessel fitted with a water-cooled condenser. The temperature was raised to 50° C. and when the polyamide had dissolved 15.5 parts of paraformaldehyde were added. The temperature was then raised to 70° C. and held for 2 hours. The product, a clear solution, was cooled and pressed out. It had the following characteristics:

| | |
|---|---|
| Solids content percent | 50 |
| Viscosity (Gardner-Holdt scale) | G |
| Colour | 11-12 |

Example 8

To 56 parts of 36.5% (w./w.) aqueous formaldehyde contained in a suitable vessel under a stream of nitrogen gas were added slowly with stirring 43.7 parts of 3,3′ di-amino-di-propylamine avoiding undue rise in temperature. When the triamine had all dissolved the temperature was raised to 90° C. and held for 30 minutes at this temperature after which 100 parts dimer acid (Empol 1022 ex Emery Industries Inc.) together with a trace of anti-foaming agent were added. The temperature was maintained between 90 and 100° C. for about 90 minutes when the water-cooled condenser was replaced by an air-cooled variety. The water in the charge was allowed to escape through the condenser and the temperature was raised slowly to 200° C. The material was then held at this temperature until the acid value had dropped to below 15. The product, a soft, resinous mass, was then pressed out. It had the following characteristics:

| | |
|---|---|
| Viscosity (Gardner-Holdt scale) | Y-Z (60% in 1:1 butanol/toluene). |
| Colour | 16-17 (60% in 1:1 butanol/toluene). |
| Acid value (base resin) | 11. |

Example 9

The comparative results obtained by blending epoxy resins with the unmodified polyamide resin produced as described in the first part of Example 7 and with the modified polyamide resin produced as described in Example 8, are set out below:

| | Unmodified product: Blended at 70° C. 1:1 with— | | Modified product: Blended at 70° C. 1:1 with— | |
|---|---|---|---|---|
| | (a) Epikote 828 | (b) Araldite D | (a) Epikote 828 | (b) Araldite D |
| | Mins. | Mins. | Mins. | Mins. |
| Clear, hot | 7 | 10 | 18 | 13 |
| Clear, cold | 9 | 13 | 23 | 20 |
| Gelled | 12 | 17 | 37 | 48 |

Example 10

To 111 parts of 36.5% (w./w.) aqueous formaldehyde contained in a suitable vessel under a stream of nitrogen gas were added slowly and with stirring and cooling as required 62 parts of diethylene triamine followed by 5.8 parts of 69.4% aqueous ethylene diamine solution. The temperature was raised to 90° C. and held at this temperature for 30 minutes when 200 parts of dimer acid (Empol 1022 ex Emery Industries Inc.) and a trace of anti-foaming agent were added. The charge was then maintained at between 90 and 100° C. for about 90 minutes when the water-cooled condenser was replaced by an air-cooled type. Water was allowed to escape through the trap and the temperature was slowly raised to 205° C. The charge was held at this temperature until the acid value had dropped to below 10. The product was pressed out. It was a soft, resinous mass and had the following characteristics:

Viscosity (Gardner-Holdt scale) __ P (60% in 1:1 butanol/toluene).
Colour _____ 18.
Acid value (base resin) _____ 7.

*Example 11*

Into a suitable vessel were charged under a stream of nitrogen gas 270 parts of dimer acid (Empol 1022 ex Emery Industries Inc.) and 7.3 parts of adipic acid and the temperature was raised with stirring to 70° C. when 103 parts di-ethylene triamine and a trace of anti-foaming agent were added. The charge was held at a temperature between 90 and 100° C. for about 90 minutes when the water-cooled condenser was replaced by an air-cooled condenser, the water of reaction allowed to escape and the temperature raised slowly to 200° C. The charge was maintained at this temperature until the acid value had dropped to below 5. The product was then pressed out. It had the following characteristics:

Viscosity (Gardner-Holdt scale) ____ K-L (60% in 1:1 butanol/toluene).
Colour _____ 11-12.
Acid value (base resin) _____ 3.5.

Into a suitable vessel fitted with a water-cooled condenser and decanter system for the continuous separation of water were charged with stirring 200 parts of the above polyamide, 200 parts of N-butanol and 94 parts of 36.5% (w./w.) aqueous formaldehyde together with a trace of anti-foaming agent. The charge was heated to 70° C. and held at this temperature for 2 hours. The temperature was then raised until refluxing through the condenser/decanter system commenced and was continued until no more water separated. The resin was then pressed out. It had the following characteristics:

Solids _____percent__ 50
Viscosity (Gardner-Holdt scale) _____ S
Colour _____ 15-16

*Example 12*

Into a suitable vessel were charged with stirring, 200 parts of a polyamide resin based on 1 mole of dimer fatty acid (Empol 1022 ex Emery Industries Inc.) and 2 moles of di-ethylene triamine and 200 parts of N-butanol. When the resin had dissolved, 36 parts of paraformaldehyde were added and the temperature was raised to 70° C. The charge was held at this temperature for 2 hours and was then pressed out. The resulting solution had the following characteristics:

Solids _____percent__ 50
Viscosity (Gardner-Holdt scale) _____ H-II
Colour _____ 8-10, 10

What we claim is:

1. A process for the production of formaldehyde modified polyamide resins soluble in organic solvents and suitable for further reaction with incompletely condensed phenol formaldehyde condensation products and with epoxy resins containing terminal epoxy groups, which process comprises completely reacting by heating to reaction temperature (1) a member of a group consisting of formaldehyde and substances capable of yielding formaldehyde under the conditions of the reaction, (2) a dimeric fatty acid containing two carboxyl groups only and at least 36 carbon atoms in the molecule, and (3) a monomeric aliphatic triamine, in the proportions of 0.1 to 5 moles of formaldehyde and .5–1 mole dimeric fatty acid per mole of triamine, continuing heating until the reaction is completed as long as water of condensation is being formed, and removing the water of condensation from the so formed formaldehyde modified polyamide resin.

2. A process as set forth in claim 1, wherein the organic triamine is diethylene triamine.

3. A process for the production of modified polyamide resins, which comprises reacting (a) an incompletely condensed phenol-formaldehyde resin with (b) a resin produced in accordance with claim 1.

4. A process for the production of modified polyamide resins, which comprises reacting an epoxy resin containing terminal epoxy groups having the oxygen linked to adjacent carbon atoms with a resin produced in accordance with claim 1.

5. A modified polyamide resin produced in accordance with claim 1.

6. A modified polyamide resin composition comprising an admixture of a modified polyamide resin produced in accordance with claim 1 and an incompletely condensed phenol-formaldehyde resin.

7. A modified polyamide resin composition comprising an admixture of a modified polyamide resin produced in accordance with claim 1 and an incompletely condensed phenol-formaldehyde resin in solution in a mutual solvent.

8. A modified polyamide resin composition comprising an admixture of a modified polyamide resin produced in accordance with claim 1 and an epoxy resin containing terminal epoxy groups having the oxygen linked to adjacent carbon atoms.

9. A modified polyamide resin composition comprising an admixture of a modified polyamide resin produced in accordance with claim 1 and an epoxy resin containing terminal epoxy groups having the oxygen linked to adjacent carbon atoms in solution in a mutual solvent.

10. A process for the production of modified polyamide resins, which comprises reacting at a temperature of from 150–200° C. (a) a compound selected from the group consisting of formaldehyde and substances capable of yielding formaldehyde under the conditions of the reaction, with (b) a pre-formed branched chain polyamide of a dimeric fatty acid containing two carboxyl groups only and at least 36 carbon atoms in the molecule and a monomeric aliphatic triamine (1 mole), the reactants being present in a proportion of 0.1–5.0 moles of formaldehyde per gram equivalent of unreacted free primary and secondary amino groups in the polyamide and .5–1 mole of dimeric fatty acid per mole of triamine, the heating being continued as long as water of condensation is formed, and separating out said water of condensation from the reaction product.

11. A process according to claim 10, wherein the reaction is carried out in the presence of a mutual solvent for the reactants.

12. A process for the production of modified polyamide resins, which comprises reacting at a temperature of from 150–200° C. (a) a compound selected from the group consisting of formaldehyde and substances capable of yielding formaldehyde under the conditions of the reaction, with (b) a pre-formed branched chain polyamide derived from a dimeric fatty acid containing two carboxyl groups only and at least 36 carbon atoms in the molecule (1 to 2 moles carboxyl groups) and di-ethylene triamine (1 mole), the reactants being present in a proportion of 0.1 to 5.0 moles of formaldehyde per gram equivalent of unreacted free primary and secondary amino groups in the polyamide and .5–1 mole of fatty acid per mole of triamine, the heating being continued as long as water of condensation is formed, and separating out said water of condensation from the reaction product.

References Cited in the file of this patent

UNITED STATES PATENTS

| 2,276,308 | Hummel et al. | Mar. 17, 1942 |
| 2,379,413 | Bradley | July 3, 1945 |
| 2,389,079 | Powers | Nov. 13, 1945 |
| 2,518,148 | Jordan et al. | Aug. 8, 1950 |
| 2,630,395 | McCullough et al. | Mar. 3, 1953 |
| 2,695,908 | Wittcoff et al. | Nov. 30, 1954 |
| 2,707,708 | Wittcoff | May 3, 1955 |